(12) United States Patent
Yang et al.

(10) Patent No.: US 12,446,130 B2
(45) Date of Patent: Oct. 14, 2025

(54) SYSTEM-ON-CHIP SOC AND SMOKE DETECTION DEVICE COMPRISING THE SAME

(71) Applicant: Kidde Fire Protection, LLC, Bradenton, FL (US)

(72) Inventors: Zhanlin Yang, Qinhuangdao (CN); Haiyong Lu, Qinhuangdao (CN); Maoqing Yang, Qinhuangdao (CN); Hongliang Lei, Qinhuangdao (CN); Jie Xi, Shanghai (CN); Benliang Li, Qinhuangdao (CN)

(73) Assignee: KIDDE FIRE PROTECTION, LLC, Bradenton, FL (US)

(*) Notice: Subject to any disclaimer, the term of this patent is extended or adjusted under 35 U.S.C. 154(b) by 72 days.

(21) Appl. No.: 18/466,131

(22) Filed: Sep. 13, 2023

(65) Prior Publication Data
US 2024/0098857 A1    Mar. 21, 2024

(30) Foreign Application Priority Data

Sep. 16, 2022  (CN) .......................... 202211127466.9

(51) Int. Cl.
| | | |
|---|---|---|
| H05B 45/30 | (2020.01) | |
| G08B 17/103 | (2006.01) | |
| H05B 45/345 | (2020.01) | |
| H05B 45/56 | (2020.01) | |

(52) U.S. Cl.
CPC ......... *H05B 45/345* (2020.01); *G08B 17/103* (2013.01); *H05B 45/56* (2020.01)

(58) Field of Classification Search
CPC ...... H05B 45/44; H05B 45/56; H05B 45/325; H05B 45/345; H05B 45/395; H05B 45/397; G08B 17/103; G08B 17/107; G08B 17/113
See application file for complete search history.

(56) References Cited

U.S. PATENT DOCUMENTS

| 4,166,947 A | 9/1979 | Dirksen |
| 4,277,782 A | 7/1981 | Chao |
| 6,400,101 B1 | 6/2002 | Biebl et al. |

(Continued)

FOREIGN PATENT DOCUMENTS

| CN | 207321594 U | 5/2018 |
| EP | 0929022 A1 | 7/1999 |
| EP | 1580706 A1 | 9/2005 |

OTHER PUBLICATIONS

European Search Report for Application No. 23197799.2, Issued Jan. 22, 2024, 10 Pages.

*Primary Examiner* — Tung X Le
(74) *Attorney, Agent, or Firm* — CANTOR COLBURN LLP

(57) ABSTRACT

The present application relates to a system-on-chip SoC, the system-on-chip SoC comprising: a power regulating input port; and a light-emitting diode LED driving circuit coupled with the power regulating input port, wherein the light-emitting diode LED driving circuit is used to provide a constant current output, and wherein the light-emitting diode LED driving circuit comprises an adjustable resistor, so that the constant current output changes with a change in resistance value of the adjustable resistor. The present application also relates to a smoke detection device.

9 Claims, 4 Drawing Sheets

(56) References Cited

U.S. PATENT DOCUMENTS

| | | | |
|---|---|---|---|
| 6,701,091 B2 | 3/2004 | Escobosa et al. | |
| 6,819,252 B2 | 11/2004 | Johnston et al. | |
| 7,274,251 B2 | 9/2007 | Yang | |
| 8,310,275 B2 | 11/2012 | Harris et al. | |
| 8,330,440 B2 | 12/2012 | Wachi | |
| 9,131,565 B2 | 9/2015 | Hariharan | |
| 9,510,408 B1 * | 11/2016 | Tseng | H05B 45/3725 |
| 9,622,301 B2 | 4/2017 | Warren et al. | |
| 10,004,117 B2 * | 6/2018 | Wang | H05B 45/38 |
| 10,470,265 B1 * | 11/2019 | Zhao | H05B 45/10 |
| 11,263,883 B2 | 3/2022 | Falkenburg et al. | |
| 2012/0176046 A1 * | 7/2012 | Tsai | H05B 45/10 |
| | | | 315/185 R |
| 2013/0169158 A1 * | 7/2013 | He | H05B 45/10 |
| | | | 315/121 |
| 2017/0046936 A1 * | 2/2017 | Aebersold | H05B 45/12 |
| 2017/0191877 A1 | 7/2017 | Warren et al. | |
| 2018/0014370 A1 | 1/2018 | Wang et al. | |
| 2018/0368220 A1 * | 12/2018 | Shuai | G09G 3/36 |
| 2020/0220377 A1 * | 7/2020 | Chen | H05B 45/37 |
| 2021/0312780 A1 * | 10/2021 | Morita | G08B 17/113 |
| 2021/0327239 A1 | 10/2021 | Falkenburg et al. | |

\* cited by examiner

SYSTEM-ON-CHIP SOC AND SMOKE DETECTION DEVICE COMPRISING THE SAME

CROSS REFERENCE TO A RELATED APPLICATION

The application claims the benefit of China Patent Application No. 202211127466.9 filed Sep. 16, 2022, the contents of which are hereby incorporated in their entirety.

TECHNICAL FIELD

The present application relates to system-on-chip SoC and smoke detection device comprising the same.

BACKGROUND

In an optical smoke detection device, it is usually necessary to use a light-emitting diode. In order to drive the light-emitting diode, for example, in order to drive an infrared light-emitting diode, a constant current driver supporting about 200 mA should be used.

Existing constant current drivers are generally implemented using discrete components, but this implementation is not sufficiently integrated, which may lead to a large area of a final implemented printed circuit board PCB. In addition, the existing constant current drivers can only provide a single constant current, which cannot meet driving needs of different types of light-emitting diodes, such as infrared light-emitting diodes and blue light-emitting diodes that require different driving currents.

SUMMARY

According to an aspect of the present application, there is provided a system-on-chip SoC, the system-on-chip SoC comprising: a power regulating input port; and a light-emitting diode LED driving circuit coupled with the power regulating input port, wherein the light-emitting diode LED driving circuit is used to provide a constant current output, and wherein the light-emitting diode LED driving circuit comprises an adjustable resistor, so that the constant current output changes with a change in resistance value of the adjustable resistor.

As a supplement or replacement of the foregoing, in the system-on-chip SoC, the power regulating input port is used to provide a pulse width modulated signal to the light-emitting diode LED driving circuit.

As a supplement or replacement of the foregoing, in the system-on-chip SoC, the light-emitting diode LED driving circuit further comprises: a voltage divider protection circuit; and a constant current circuit, which is coupled with the power regulating input port via the voltage divider protection circuit and regulates the constant current output according to a signal from the power regulating input port.

As a supplement or replacement of the foregoing, in the system-on-chip SoC, the constant current circuit comprises a triode, wherein a base of the triode is coupled with the voltage divider protection circuit, an emitter of the triode is grounded via the adjustable resistor, and a collector of the triode is coupled with a light-emitting diode.

As a supplement or replacement of the foregoing, in the system-on-chip SoC, the light-emitting diode is located outside the system-on-chip SoC.

As a supplement or replacement of the foregoing, in the system-on-chip SoC, the voltage divider protection circuit comprises: a first resistor and a second resistor, wherein one end of the first resistor is coupled with the power regulating input port, other end of the first resistor is coupled with the base of the triode, one end of the second resistor is coupled with the base of the triode, and other end of the second resistor is coupled with ground.

As a supplement or replacement of the foregoing, the system-on-chip SoC further comprises: a low dropout regulator LDO used to provide a chip voltage to the light-emitting diode LED driving circuit via the power regulating input port.

According to another aspect of the present application, there is provided a smoke detection device, the smoke detection device comprising: the system-on-chip SoC; and one or more light-emitting diodes coupled with the system-on-chip SoC.

As a supplement or replacement of the foregoing, the smoke detection device further comprises: a photodetector configured to receive light emitted by the light-emitting diodes; and a microcontroller configured to determine whether smoke is present based on intensity of the received light.

As a supplement or replacement of the foregoing, in the smoke detection device, the light-emitting diodes are blue light-emitting diodes and/or infrared light-emitting diodes.

As a supplement or replacement of the foregoing, the smoke detection device further comprises: a protective resistor connected in parallel with the light-emitting diodes.

DESCRIPTION OF THE DRAWINGS

The above and/or other aspects and advantages of the present application will be clearer and more easily understood from the following description of various aspects in conjunction with the accompanying drawings, in which the same or similar elements are denoted by the same reference numerals. The accompanying drawings include.

DETAILED DESCRIPTION

The present application is described more fully below with reference to the accompanying drawings, in which illustrative embodiments of the application are illustrated. However, the present application may be implemented in different forms and should not be construed as limited to the embodiments presented herein. The presented embodiments are intended to make the disclosure herein comprehensive and complete, so as to more comprehensively convey the protection scope of the application to those skilled in the art.

In this specification, terms such as "comprising" and "including" mean that in addition to units and steps that are directly and clearly stated in the specification and claims, the technical solution of the application does not exclude the presence of other units and steps that are not directly or clearly stated in the specification and claims.

Unless otherwise specified, terms such as "first" and "second" do not indicate the order of the units in terms of time, space, size, etc., but are merely used to distinguish the units.

In this specification, "coupling" or "coupled" should be understood as including a case in which electrical energy or electrical signals are transmitted directly between two units, or a case in which electrical energy or electrical signals are transmitted indirectly through one or more third units.

In accordance with some embodiments of the present application, a light-emitting diode LED driving circuit is integrated using a system-on-chip SoC, which provides a higher degree of integration compared to existing solutions that use discrete components. Moreover, the integrated light-emitting diode LED driving circuit includes an adjustable resistor, so that a constant current output changes with a change in resistance value of the adjustable resistor. In this way, different constant current outputs can be realized by adjusting the resistance value of the adjustable resistor, thereby meeting the current driving needs of different types of light-emitting diodes (e.g., infrared light-emitting diodes, blue light-emitting diodes, etc.).

Specific embodiments of the present application are further described below with the aid of the accompanying drawings. It should be noted that some non-essential features or circuit elements are not shown in the accompanying drawings for the purpose of more clearly describing what is relevant to the present application. However, for those skilled in the art, such omissions do not create difficulties in the implementations of the technical solutions described in the specification of the present application.

Figure 1:
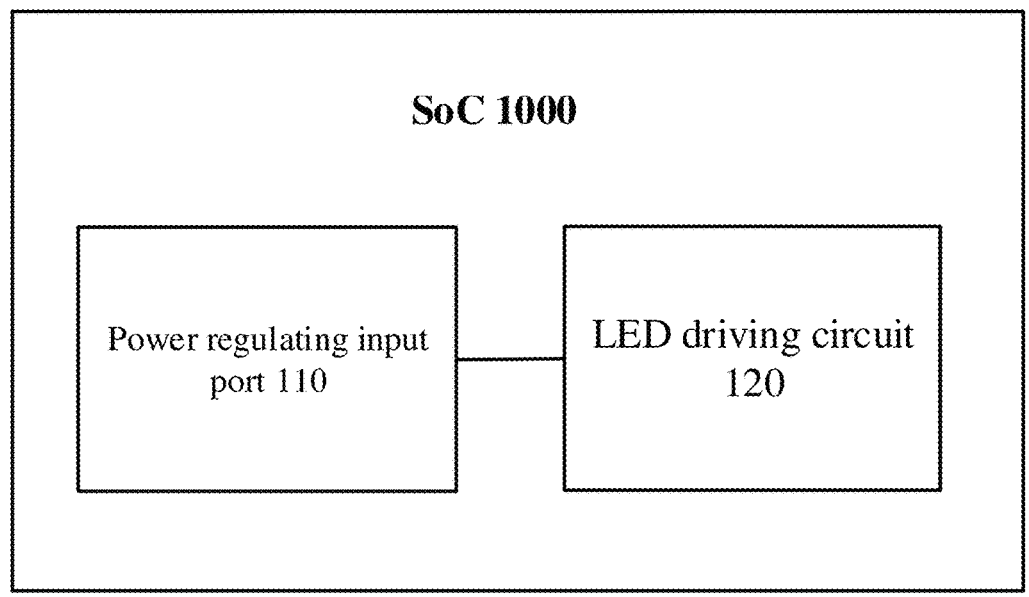
FIG. 1 is a structural schematic diagram of a system-on-chip SoC according to embodiments of the present application.

FIG. 1 is a structural schematic diagram of a system-on-chip SoC 1000 according to embodiments of the present application. As shown in FIG. 1, the system-on-chip SoC 1000 comprises: a power regulating input port 110 and a light-emitting diode LED driving circuit 120 coupled with the power regulating input port 110, wherein the light-emitting diode LED driving circuit 120 is used to provide a constant current output, and wherein the light-emitting diode LED driving circuit 120 comprises an adjustable resistor (not shown in FIG. 1), so that the constant current output changes with a change in resistance value of the adjustable resistor.

In the context of the present application, SoC is an abbreviation for System on Chip, which directly translates to "chip-level system", usually referred to as "system-on-chip", which is a system or product formed by combining a plurality of integrated circuits with specific functions on a single chip, including a complete hardware system and embedded software it carries. For example, the system-on-chip SoC may integrate a microprocessor, analog IP (Intellectual Property) core, digital IP core, and memory (or off-chip memory control interface) on a single chip.

This means that on a single chip, the functions of an electronic system can be completed, and this system used to require one or more circuit boards, as well as various electronic devices, chips and interconnection lines on the board to cooperate together to achieve.

In some embodiments of the present application, the power regulating input port 110 is used to provide a pulse width modulated signal to the light-emitting diode LED driving circuit 120. For example, the pulse width modulated signal is a high voltage signal with a pulse frequency between 200 Hz and 400 Hz and a variable duty cycle. In one embodiment, by providing the pulse width modulated signal to the light-emitting diode LED driving circuit 120, the light-emitting diode LED driving circuit 120 is enabled to operate the light-emitting diode (e.g., infrared light) utilizing one or more pulses, with each pulse lasting approximately 2-23 microseconds. It is understood that in other embodiments, the pulses may last more than 23 microseconds or less than 2 microseconds.

Figure 2:
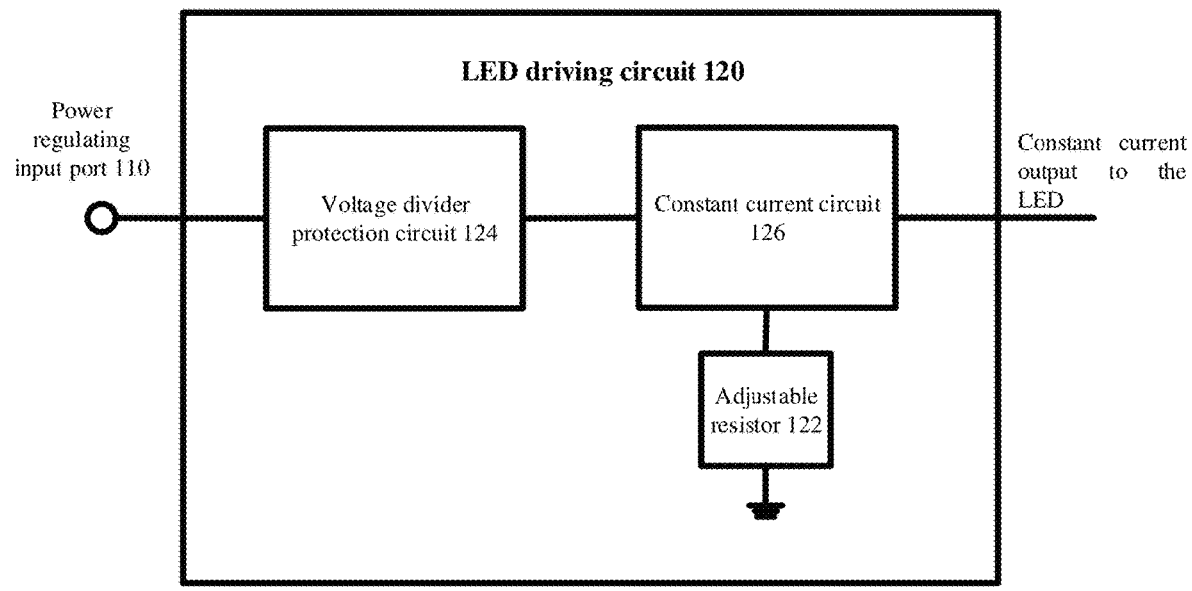
FIG. 2 is a structural schematic diagram of an LED driving circuit according to embodiments of the present application.

The light-emitting diode LED driving circuit 120 is used to provide a constant driving current to the light-emitting diode. FIG. 2 shows a structural schematic diagram of the light-emitting diode LED driving circuit 120 according to some embodiments of the present application. As shown in FIG. 2, the light-emitting diode LED driving circuit 120 comprises an adjustable resistor 122, and a constant current output of the light-emitting diode LED driving circuit 120 changes with a change in resistance value of the adjustable resistor 122. In addition to the adjustable resistor 122, the light-emitting diode LED driving circuit 120 also comprises: a voltage divider protection circuit 124 and a constant current circuit 126, wherein the constant current circuit 126 is coupled with the power regulating input port 110 via the voltage divider protection circuit 124 and regulates the constant current output to the LED according to a signal from the power regulating input port 110.

Figure 3:
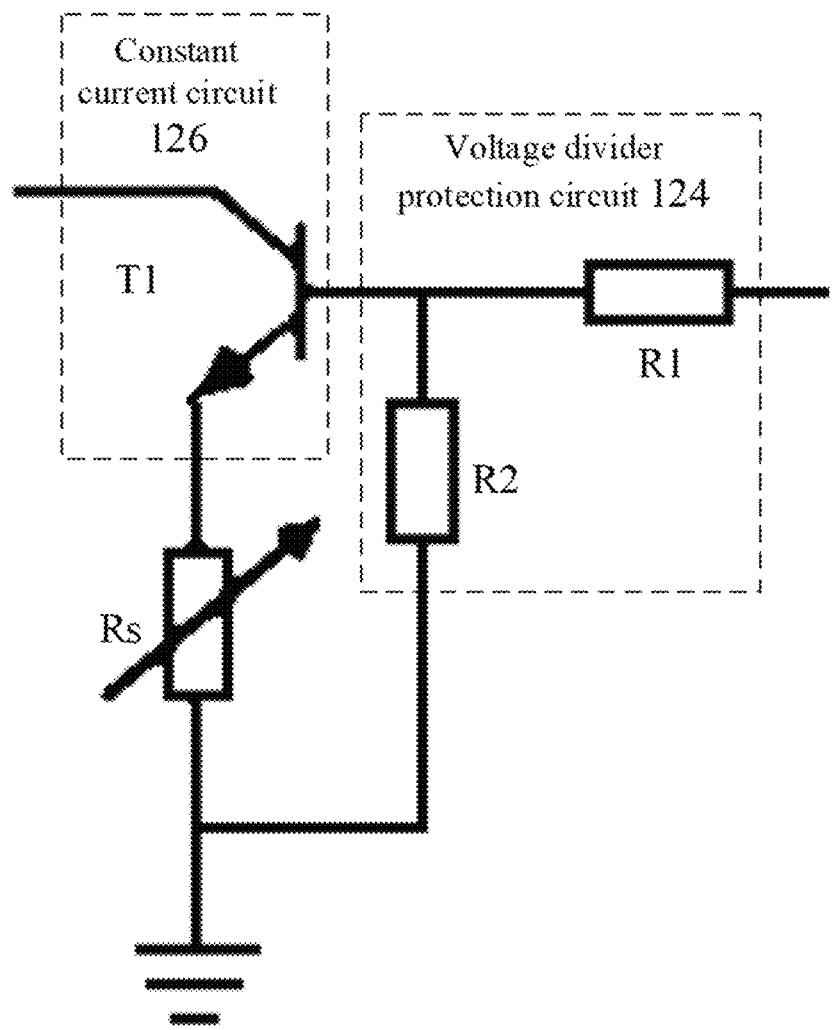
FIG. 3 is a circuit schematic diagram of an LED driving circuit according to embodiments of the present application.

FIG. 3 is a circuit schematic diagram of an LED driving circuit according to embodiments of the present application. As shown in FIG. 3, the constant current circuit 126 includes a transistor T1. A base of the transistor T1 is coupled with the voltage divider protection circuit 124, an emitter of the transistor T1 is grounded via an adjustable resistor Rs, and a collector of the transistor T1 is coupled with a light-emitting diode (not shown in FIG. 3). In one embodiment, the light-emitting diode is located outside the system-on-chip SoC. In this way, the light-emitting diode is arranged with greater freedom. Of course, a person skilled in the art may understand that in other embodiments, the light-emitting diode may be arranged on the system-on-chip SoC as desired.

With continued reference to FIG. 3, the voltage divider protection circuit 124 includes: a first resistor R1 and a second resistor R2, wherein one end of the first resistor R1 is coupled with the power regulating input port 110 (not shown in FIG. 3), the other end of the first resistor R1 is coupled with the base of the transistor T1, one end of the second resistor R2 is coupled with the base of the transistor T1, and the other end of the second resistor R2 is coupled with ground.

The operating principle of the LED driving circuit shown in FIG. 3 is described below. When the power regulating input port 110 provides a high level voltage to the base of the transistor T1 via the voltage divider protection circuit 124, the entire LED driving circuit acts as an "OC" gate, i.e., an open collector gate, and the collector current of the transistor T1 is substantially equal to the emitter current.

In addition, because the base-emitter voltage drop of the transistor T1 in conduction is basically a fixed value, about 0.6V, thus in the case of base voltage Ub of the transistor T1 is known, the voltage across the adjustable resistor is Ub-0.6, and thus the emitter current of the transistor T1 may be determined according to the following formula: $Ie=(Ub-0.6)/Rs$.

As mentioned above, because the collector current Ic and the emitter current Ie of the transistor T1 are basically equal, $Ic \approx Ie=(Ub-0.6)/Rs$. That is to say, the driving current provided to the light-emitting diode may be determined according to the collector current Ic. When the LED driving circuit needs to be adapted to different types of light-emitting diodes, the collector current Ic (driving current) of the transistor T1 may be changed by adjusting the resistance value of the adjustable resistor Rs.

Figure 5:
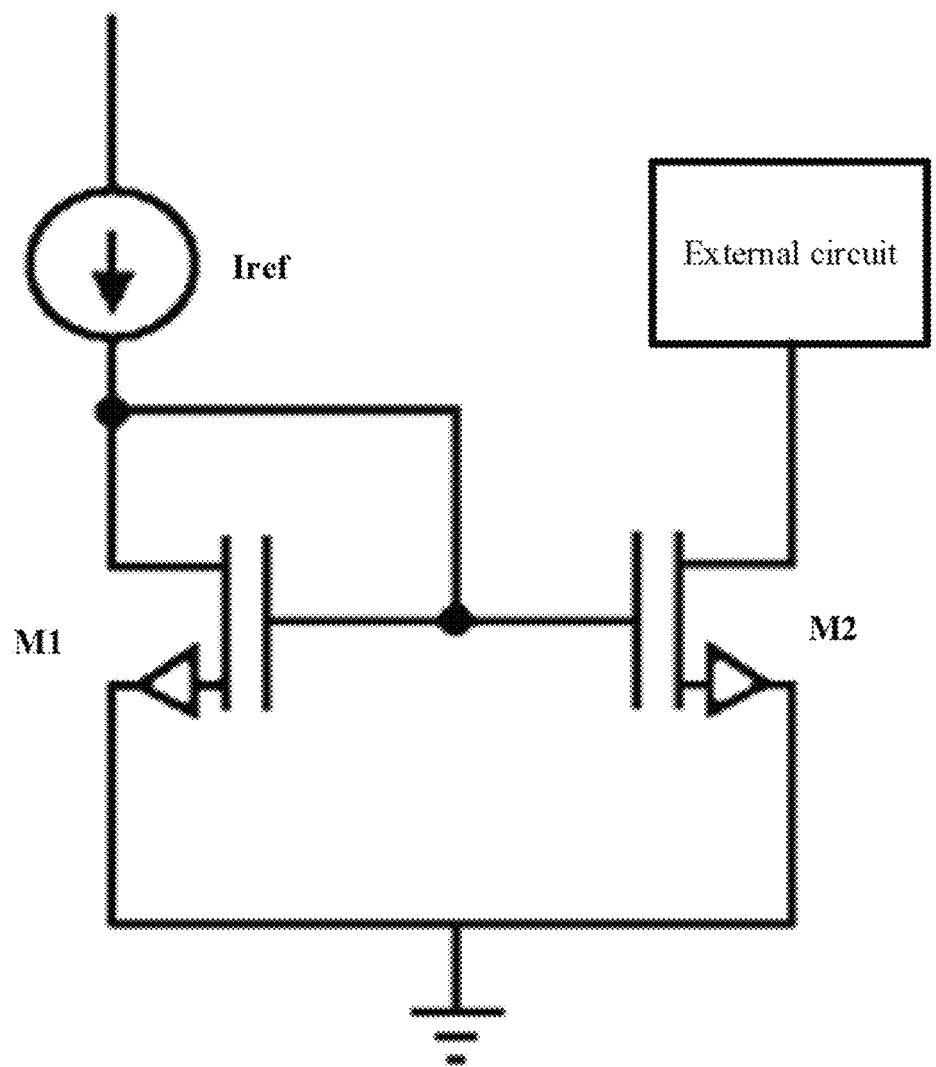
FIG. 5 is a circuit schematic diagram of an LED driving circuit implemented by means of a current mirror.

FIG. 5 shows a circuit schematic diagram of an LED driving circuit implemented by means of a current mirror. A current mirror circuit consists of two MOSFETs M1 and M2 (may also include other circuit components, not shown), where the gate of M1 is coupled with the gate of M2, and the source of M1 is also coupled with the source of M2. The two field effect tubes are basically mirrored arrangement. In FIG. 5, the gate of M1 is connected with its drain and a reference current source Iref is input from the gate of M1, then a mirrored current is also generated at the gate of M2, which is provided to an external circuit.

Compared to the current mirror circuit shown in FIG. 5, the implementation of the LED driving circuit of the embodiments shown in FIG. 3 is relatively simple and low-cost, i.e., only one transistor and three resistors need to be integrated into the system-on-chip SoC to obtain the constant current driver. In addition, the use of the transistor T1 in the system-on-chip SoC is capable of accommodating higher voltages and currents as compared to MOS field effect tubes (MOSFETs). In one or more embodiments, the adjustable resistor can be used to adjust the multi-stage driving current.

In one or more embodiments, although not shown in FIG. 1, the system-on-chip SoC 1000 may also include: a low dropout voltage regulator LDO, for use in providing a chip voltage (e.g., VDD) to the light-emitting diode LED driving circuit 120 via the power regulating input port 110.

Figure 4:
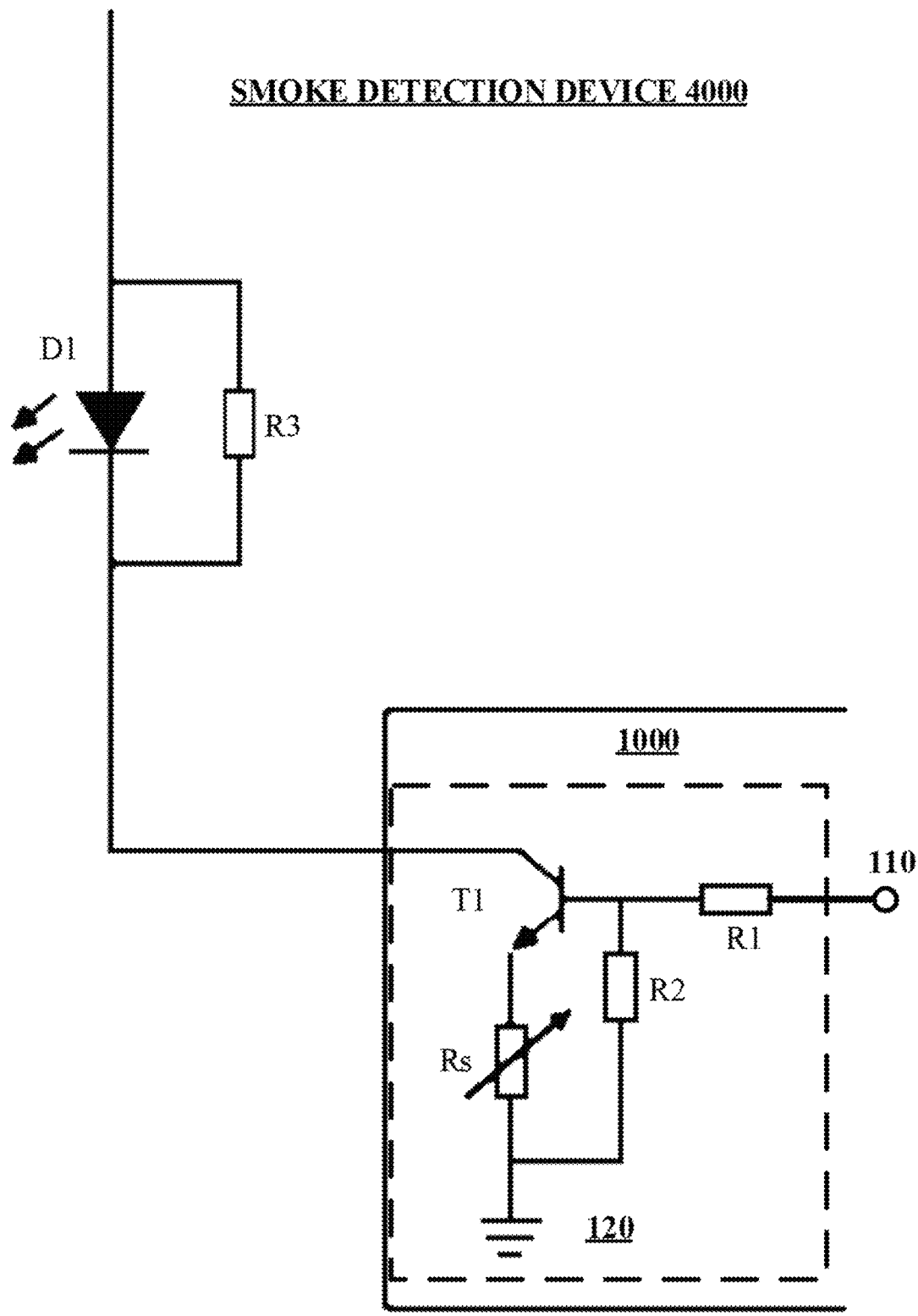
FIG. 4 is a block diagram of a smoke detection device according to embodiments of the present application.

FIG. 4 is a block diagram of a smoke detection device 4000 according to embodiments of the present application. As shown in FIG. 4, the smoke detection device 4000 includes the system-on-chip SoC 1000 and a light-emitting diode D1. It should be noted that although only one light-emitting diode is shown in FIG. 4, in other embodiments, the smoke detection device 4000 may include two or more light-emitting diodes. In one or more embodiments, the light-emitting diode is blue light-emitting diode and/or infrared light-emitting diode.

With continued reference to FIG. 4, a negative electrode of the light-emitting diode D1 is coupled to the system-on-chip SoC 1000 (more specifically, to the collector of the transistor T1 in the LED driving circuit 120). The specific internal structure of the system-on-chip SoC 1000 has been described in the previous and will not be repeated here.

In addition, in FIG. 4, a protective resistor R3 is connected in parallel at both ends of the light-emitting diode D1. The protective resistor R3 can act as a shunt when a large current is input to prevent the light-emitting diode D1 from overheating and burning out.

In one embodiment, although not shown in FIG. 4, the smoke detection device 4000 may further include: a photodetector and a microcontroller. Wherein the photodetector is configured to receive light emitted by the light-emitting diode; and the microcontroller is configured to determine whether smoke is present based on intensity of the received light. The photodetector may, for example, be a photosensitive element configured to receive the light emitted by the light-emitting diode. In one embodiment, the microcontroller is coupled with the photodetector and configured to determine whether smoke is present based on the intensity of the light emitted by the light-emitting diode and the intensity of the light received by the photodetector, and to instruct an output device (e.g., an audio device) to send an alarm indication signal when the presence of smoke is determined. Exemplarily, the microcontroller may compare the intensity of the light emitted by the light-emitting diode with the intensity of the light received by the photodetector, and determine that smoke is present on the path of propagation of the light if the difference between the two intensities is greater than a set threshold.

In summary, in some embodiments of the present application, the use of the system-on-chip SoC to integrate the light-emitting diode LED driving circuit results in higher integration and simpler implementation. Moreover, the integrated light-emitting diode LED driving circuit includes the adjustable resistor, so that the constant current output changes with a change in resistance value of the adjustable resistor. In this way, different constant current outputs can be realized by adjusting the resistance value of the adjustable resistor, thereby meeting the current driving needs of different types of light-emitting diodes (e.g., infrared light-emitting diodes, blue light-emitting diodes, etc.).

Those skilled in the art will appreciate that the various illustrative logical blocks, modules, circuits, and algorithm steps described herein may be implemented as electronic hardware, computer software, or combinations of both.

To demonstrate this interchangeability between hardware and software, various illustrative components, blocks, modules, circuits, and steps have been described above generally in terms of their functionality. Whether such functionality is implemented in hardware or software depends on the particular application and design constraints imposed on the overall system. Those skilled in the art may implement the described functionality in changing ways for the particular application. However, such implementation decisions should not be interpreted as causing a departure from the scope of the present application.

Although only a few of the specific embodiments of the present application have been described, those skilled in the art will appreciate that the present application may be embodied in many other forms without departing from the spirit and scope thereof. Accordingly, the examples and implementations presented are to be regarded as illustrative and not restrictive, and various modifications and substitutions may be covered by the application without departing from the spirit and scope of the application as defined by the appended claims.

The embodiments and examples presented herein are provided to best illustrate embodiments in accordance with the present technology and its particular application, and to thereby enable those skilled in the art to implement and use the present application. However, those skilled in the art will appreciate that the above description and examples are provided for convenience of illustration and example only. The presented description is not intended to cover every aspect of the application or to limit the application to the precise form disclosed.

What is claimed is:

1. A system-on-chip (SoC) comprising:
   a power regulating input port;
   a light-emitting diode LED driving circuit coupled with the power regulating input port, wherein the light-emitting diode LED driving circuit is used to provide a constant current output, and wherein the light-emitting diode LED driving circuit comprises an adjustable resistor, so that the constant current output changes with a change in resistance value of the adjustable resistor;
   a voltage divider protection circuit; and
   a constant current circuit, which is coupled with the power regulating input port via the voltage divider protection circuit and regulates the constant current output according to a signal from the power regulating input port;

wherein the constant current circuit comprises a triode, wherein a base of the triode is coupled with the voltage divider protection circuit, an emitter of the triode is grounded via the adjustable resistor, and a collector of the triode is coupled with a light-emitting diode.

2. The system-on-chip (SoC) of claim 1, wherein the power regulating input port is used to provide a pulse width modulated signal to the light-emitting diode LED driving circuit.

3. The system-on-chip (SoC) of claim 2, further comprising:
a low dropout voltage regulator (LDO) used to provide a chip voltage to the light-emitting diode LED driving circuit via the power regulating input port.

4. The system-on-chip (SoC) of claim 1, wherein the light-emitting diode is located outside the system-on-chip (SoC).

5. The system-on-chip (SoC) of claim 1, wherein the voltage divider protection circuit comprises: a first resistor and a second resistor, wherein one end of the first resistor is coupled with the power regulating input port, other end of the first resistor is coupled with the base of the triode, one end of the second resistor is coupled with the base of the triode, and other end of the second resistor is coupled with ground.

6. A smoke detection device comprising:
the system-on-chip (SoC) of claim 1; and
one or more light-emitting diodes coupled with the system-on-chip (SoC).

7. The smoke detection device of claim 6, further comprising:
a photodetector configured to receive light emitted by the light-emitting diodes; and
a microcontroller configured to determine whether smoke is present based on intensity of the received light.

8. The smoke detection device of claim 6, wherein the light-emitting diodes are blue light-emitting diodes and/or infrared light-emitting diodes.

9. The smoke detection device of claim 6, further comprising:
a protective resistor connected in parallel with the light-emitting diodes.

* * * * *